(12) United States Patent
Michaud et al.

(10) Patent No.: US 12,212,575 B2
(45) Date of Patent: Jan. 28, 2025

(54) USER ROLE-DRIVEN METADATA LAYERS IN A DATA MESH

(71) Applicant: Cisco Technology, Inc., San Jose, CA (US)

(72) Inventors: Frank Michaud, Pully (CH); Peshan Sampath Kalu Marakkala, Morrisville, NC (US)

( * ) Notice: Subject to any disclaimer, the term of this patent is extended or adjusted under 35 U.S.C. 154(b) by 272 days.

(21) Appl. No.: 17/725,898

(22) Filed: Apr. 21, 2022

(65) Prior Publication Data

US 2023/0344834 A1    Oct. 26, 2023

(51) Int. Cl.
*H04L 9/40* (2022.01)
*G06F 21/62* (2013.01)

(52) U.S. Cl.
CPC ........ *H04L 63/105* (2013.01); *G06F 21/6218* (2013.01)

(58) Field of Classification Search
CPC ............................ H04L 63/105; G06F 21/6218
See application file for complete search history.

(56) References Cited

U.S. PATENT DOCUMENTS

| | | | |
|---|---|---|---|
| 6,611,838 B1 * | 8/2003 | Ignat ..................... | G06F 16/254 |
| 6,950,821 B2 | 9/2005 | Faybishenko et al. | |
| 7,185,016 B1 * | 2/2007 | Rasmussen ............ | G06Q 10/10 |
| 8,256,007 B2 * | 8/2012 | Dossett ................. | H04L 9/0833 |
| | | | 713/193 |
| 8,788,628 B1 * | 7/2014 | Taylor ................... | G06F 16/182 |
| | | | 709/219 |
| 9,852,149 B1 * | 12/2017 | Taylor ................. | G06F 16/1844 |
| 9,852,288 B2 * | 12/2017 | Nallagonda ............ | G06F 21/53 |
| 10,102,374 B1 * | 10/2018 | Cohen ................... | G06F 21/554 |
| 10,360,245 B2 * | 7/2019 | Klahre .................... | G06F 16/25 |
| 10,394,637 B2 * | 8/2019 | Agarwal ............ | G06F 11/3006 |
| 10,453,111 B2 | 10/2019 | Melcher et al. | |
| 10,462,053 B2 | 10/2019 | Hui | |
| 10,567,280 B2 | 2/2020 | Hui et al. | |
| 10,645,056 B2 | 5/2020 | Petersen et al. | |
| 10,819,820 B1 | 10/2020 | Zhu et al. | |
| 10,963,485 B1 * | 3/2021 | Matsushita .......... | G06F 16/128 |
| 11,093,442 B1 * | 8/2021 | Bhutani ................ | G06F 16/119 |
| 11,343,142 B1 * | 5/2022 | Wang .................... | G06F 9/3867 |

(Continued)

OTHER PUBLICATIONS

"Resource Description Framework", online: https://en.wikipedia.org/wiki/Resource_Description_Framework, Mar. 11, 2022, accessed Apr. 11, 2022, 11 pages, Wikimedia Foundation, Inc.

(Continued)

*Primary Examiner* — Aravind K Moorthy
(74) *Attorney, Agent, or Firm* — Behmke Innovation Group LLC; James M. Behmke; James J. Wong

(57) ABSTRACT

In one embodiment, a device of a data mesh generates a first metadata layer for the data mesh that comprises metadata regarding a dataset having a plurality of data sources. The device identifies user role-specific metadata associated with a particular user role and based at least in part on the metadata regarding the dataset. The device generates a second metadata layer for the data mesh that comprises the user role-specific metadata associated with the particular user role. The device provides the user role-specific metadata for presentation to a user associated with the particular user role.

20 Claims, 11 Drawing Sheets

(56) References Cited

U.S. PATENT DOCUMENTS

| | | | | |
|---|---|---|---|---|
| 11,636,108 | B1* | 4/2023 | Xu | G06N 5/04 |
| | | | | 707/714 |
| 11,720,585 | B1* | 8/2023 | Mallasch | G06F 16/258 |
| | | | | 707/690 |
| 11,748,568 | B1* | 9/2023 | Orhan | H04L 43/16 |
| | | | | 709/224 |
| 11,768,837 | B1* | 9/2023 | Newman | G06F 16/24575 |
| | | | | 707/722 |
| 11,792,457 | B1* | 10/2023 | Nayak | H04N 21/25 |
| | | | | 725/14 |
| 11,829,332 | B1* | 11/2023 | Nayar | G06F 16/176 |
| 11,861,356 | B1* | 1/2024 | Chinnakannan | G06F 8/65 |
| 11,928,356 | B2* | 3/2024 | Luo | G06F 3/0604 |
| 12,008,130 | B1* | 6/2024 | Thangavelu | G06F 16/164 |
| 12,088,541 | B1* | 9/2024 | Kheit | G06F 16/289 |
| 2006/0230027 | A1* | 10/2006 | Kellet | G06F 16/30 |
| 2008/0155060 | A1* | 6/2008 | Weber | G06F 16/958 |
| | | | | 709/218 |
| 2009/0119576 | A1* | 5/2009 | Pepper | G06F 40/169 |
| | | | | 707/999.102 |
| 2010/0302947 | A1 | 12/2010 | Leppanen et al. | |
| 2011/0093487 | A1* | 4/2011 | Le Biannic | G06F 16/254 |
| | | | | 707/765 |
| 2011/0131248 | A1* | 6/2011 | Thepaut | G06F 16/289 |
| | | | | 707/E17.055 |
| 2011/0239195 | A1* | 9/2011 | Lin | G06F 8/71 |
| | | | | 717/126 |
| 2011/0282899 | A1* | 11/2011 | Mathew | G06F 16/2428 |
| | | | | 707/769 |
| 2012/0066765 | A1* | 3/2012 | O'Brien | G06F 21/554 |
| | | | | 726/23 |
| 2012/0124478 | A1* | 5/2012 | King | G06F 16/90 |
| | | | | 715/738 |
| 2012/0143832 | A1* | 6/2012 | Aronovich | G06F 16/1748 |
| | | | | 707/E17.002 |
| 2013/0096943 | A1* | 4/2013 | Carey | G16B 50/40 |
| | | | | 705/2 |
| 2013/0110779 | A1* | 5/2013 | Taylor | G06F 16/1844 |
| | | | | 707/624 |
| 2013/0219038 | A1* | 8/2013 | Lee | H04L 45/03 |
| | | | | 709/223 |
| 2014/0130092 | A1* | 5/2014 | Kunisetty | H04N 21/4828 |
| | | | | 725/40 |
| 2014/0172808 | A1* | 6/2014 | Burge | G06F 21/604 |
| | | | | 707/694 |
| 2014/0330901 | A1 | 11/2014 | Chang et al. | |
| 2015/0121059 | A1* | 4/2015 | Davis | G06F 9/44505 |
| | | | | 713/100 |
| 2016/0196304 | A1* | 7/2016 | Nair | G06F 16/2455 |
| | | | | 707/769 |
| 2016/0366233 | A1* | 12/2016 | Le | H04L 67/51 |
| 2016/0371496 | A1* | 12/2016 | Sell | G06F 21/52 |
| 2017/0091626 | A1* | 3/2017 | Castelli | G06F 16/335 |
| 2017/0103167 | A1* | 4/2017 | Shah | G06Q 10/101 |
| 2018/0083992 | A1* | 3/2018 | Bose | H04L 63/1425 |
| 2018/0121492 | A1* | 5/2018 | Sawhney | G06F 16/2365 |
| 2018/0129793 | A1* | 5/2018 | Ulis | G06F 21/12 |
| 2019/0026322 | A1* | 1/2019 | Gerweck | G06Q 30/02 |
| 2019/0294436 | A1* | 9/2019 | Oda | H04M 11/00 |
| 2019/0306519 | A1* | 10/2019 | Chen | H04N 21/85406 |
| 2019/0340554 | A1* | 11/2019 | Dotan-Cohen | G06Q 10/06313 |
| 2020/0004848 | A1* | 1/2020 | Wood | G06N 5/04 |
| 2020/0053190 | A1* | 2/2020 | Uddin | H04L 45/64 |
| 2020/0082117 | A1* | 3/2020 | Simmons | H04L 63/105 |
| 2020/0126324 | A1* | 4/2020 | Hutchins | G07C 5/0858 |
| 2020/0133809 | A1* | 4/2020 | Han | G06F 3/0689 |
| 2020/0150935 | A1* | 5/2020 | Bucur | G06F 9/452 |
| 2020/0201819 | A1 | 6/2020 | Nishimoto et al. | |
| 2020/0204375 | A1* | 6/2020 | Coulmeau | G06N 20/10 |
| 2020/0296112 | A1* | 9/2020 | Namboodiri | G06F 21/44 |
| 2020/0380049 | A1* | 12/2020 | Pelleg | G06F 16/951 |
| 2021/0004765 | A1* | 1/2021 | Creager | G06F 16/211 |
| 2021/0042638 | A1* | 2/2021 | Novotny | G06N 20/00 |
| 2021/0089523 | A1* | 3/2021 | Debaecker | G06F 16/245 |
| 2021/0096894 | A1* | 4/2021 | Rupprecht | G06F 9/5077 |
| 2021/0173621 | A1* | 6/2021 | Fender | G06F 8/71 |
| 2021/0185068 | A1* | 6/2021 | Cova | H04L 41/064 |
| 2021/0191718 | A1* | 6/2021 | Draude | G06F 8/77 |
| 2021/0258792 | A1* | 8/2021 | Rodriguez Bravo | H04W 24/04 |
| 2021/0306227 | A1* | 9/2021 | Atighetchi | H04L 63/107 |
| 2021/0306416 | A1* | 9/2021 | Mukhopadhyay | H04L 41/12 |
| 2021/0406716 | A1* | 12/2021 | Broyles | G06F 40/174 |
| 2022/0035819 | A1* | 2/2022 | Hisada | G06F 9/5077 |
| 2022/0103572 | A1* | 3/2022 | Strayer | H04L 63/123 |
| 2022/0114509 | A1* | 4/2022 | Pinheiro | G06Q 10/0637 |
| 2022/0148568 | A1* | 5/2022 | Kulkarni | G10L 15/22 |
| 2022/0215948 | A1* | 7/2022 | Bardot | G16H 40/67 |
| 2022/0224637 | A1* | 7/2022 | S | H04L 63/0281 |
| 2022/0237309 | A1* | 7/2022 | Reineke | G06F 21/6245 |
| 2022/0269184 | A1* | 8/2022 | Lin | G06F 30/27 |
| 2022/0309037 | A1* | 9/2022 | Gutierrez | G06F 16/16 |
| 2022/0314797 | A1* | 10/2022 | Kindermann | B60K 35/60 |
| 2022/0318591 | A1* | 10/2022 | Haderbache | G06F 30/23 |
| 2022/0327119 | A1* | 10/2022 | Gasper | G06F 16/906 |
| 2022/0407924 | A1* | 12/2022 | Buchmann | H04L 67/565 |
| 2023/0008975 | A1* | 1/2023 | Crudele | H04W 12/126 |
| 2023/0021849 | A1* | 1/2023 | Olenoski | G06Q 10/083 |
| 2023/0105185 | A1* | 4/2023 | Vangala | G06Q 10/109 |
| | | | | 705/7.18 |
| 2023/0107221 | A1* | 4/2023 | Lee | G06N 7/01 |
| | | | | 706/12 |
| 2023/0111193 | A1* | 4/2023 | Uniyal | G06F 40/134 |
| | | | | 715/205 |
| 2023/0131099 | A1* | 4/2023 | Anamandra | A61B 5/024 |
| | | | | 705/7.15 |
| 2023/0156300 | A1* | 5/2023 | Mathur | G06Q 30/0241 |
| | | | | 725/32 |
| 2023/0237076 | A1* | 7/2023 | Fan | G06F 16/287 |
| | | | | 707/737 |
| 2023/0305998 | A1* | 9/2023 | Bosch | G06F 16/168 |
| 2023/0315877 | A1* | 10/2023 | McMillon | G06N 20/00 |
| | | | | 726/27 |
| 2023/0333901 | A1* | 10/2023 | Kale | G06F 9/5044 |
| 2023/0342079 | A1* | 10/2023 | Shveidel | G06F 3/061 |

OTHER PUBLICATIONS

"Web Ontology Language", online: https://en.wikipedia.org/wiki/Web_Ontology_Language, Apr. 10, 2022, accessed Apr. 11, 2022, 12 pages, Wikimedia Foundation, Inc.

"Introduction to Data Lakes", online: https://databricks.com/discover/data-lakes/introduction, accessed Apr. 11, 2022, 5 pages, Databricks Inc.

Dehghani, Zhamak, "Data Mesh Principles and Logical Architecture", online: https://martinfowler.com/articles/data-mesh-principles.html, Dec. 3, 2020, accessed Dec. 22, 2021, 27 pages.

"Web Ontology Language (OWL)", online: https://www.w3.org/OWL/, Dec. 11, 2012, accessed Apr. 21, 2022, 3 pages, Semantic Web Standards.

"Resource Description Framework (RDF)", online: https://www.w3.org/RDF/, Feb. 25, 2014, accessed Apr. 21, 2022, 3 pages, Semantic Web Standards.

"Data Mesh | Technology Radar | Thoughtworks", online: https://www.thoughtworks.com/radar/techniques/data-mesh, Mar. 29, 2022, accessed Apr. 21, 2022, 3 pages, Thoughtworks.

Greenberg, et al., "Metadata: A Fundamental Component of the Semantic Web", online: https://asistdl.onlinelibrary.wiley.com/doi/pdf/10.1002/bult.282, Apr./May 2003, accessed Apr. 21, 2022, 3 pages, Bulletin of the American Society for Information Science and Technology.

Dehghani, Zhamak, "Kafka Summit Europe 2021 Keynote: How to Build the Data Mesh Foundation", online: https://www.youtube.com/watch?v=QF41q10NSAs, May 12, 2021, accessed Apr. 21, 2022, 62 pages, YouTube.

Dehghani, Zhamak, "How to Move Beyond a Monolithic Data Lake to a Distributed Data Mesh", online: https://martinfowler.com/articles/data-monolith-to-mesh.html, May 20, 2019, accessed Apr. 21, 2022, 32 pages.

(56) References Cited

OTHER PUBLICATIONS

"Mesh Networking", online: https://en.wikipedia.org/wiki/Mesh_networking, Apr. 17, 2022, 4 pages, Wikimedia Foundation, Inc.

* cited by examiner

USER ROLE-DRIVEN METADATA LAYERS IN A DATA MESH

TECHNICAL FIELD

The present disclosure relates generally to computer networks, and, more particularly, to user role-driven metadata layers in a data mesh.

BACKGROUND

Data platforms have evolved over the years, with the latest generation being referred to as 'data meshes.' Initially, data was typically stored in proprietary, enterprise data warehouses, which required the enterprise to continually administer both the hardware and software needs of the system. More recently, data lakes have evolved, whereby data from many sources can be stored in a centralized manner (e.g., in the cloud) and without imposing a proprietary schema on the data, greatly simplifying the initial data ingestion operation. However, data lakes are still centralized in nature, requiring a dedicated team to administer the entirety of the data, even though different portions of the data are used by different teams and for different purposes. Thus, data meshes have recently been proposed to decentralize the data so that the different datasets remain within their own domains.

A key observation herein is that different types of users may have very different concerns and uses for the same underlying data. For instance, a machine learning engineer may care about the quality of the data, for purposes of training and testing a machine learning model (e.g., that the data does not include duplicate entries, that the data does not include errors, etc.). A security expert, in contrast, may only care that the data is stored and shared in a manner that complies with the various data sovereignty laws, regulations, and other requirements (e.g., personal data collected in the European Union complies with their General Data Protection Regulation), confidential data is not shared outside of trusted personnel, and the like. In other words, even in a data mesh, there may be very different stakeholders that view the underlying data through very different lenses.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
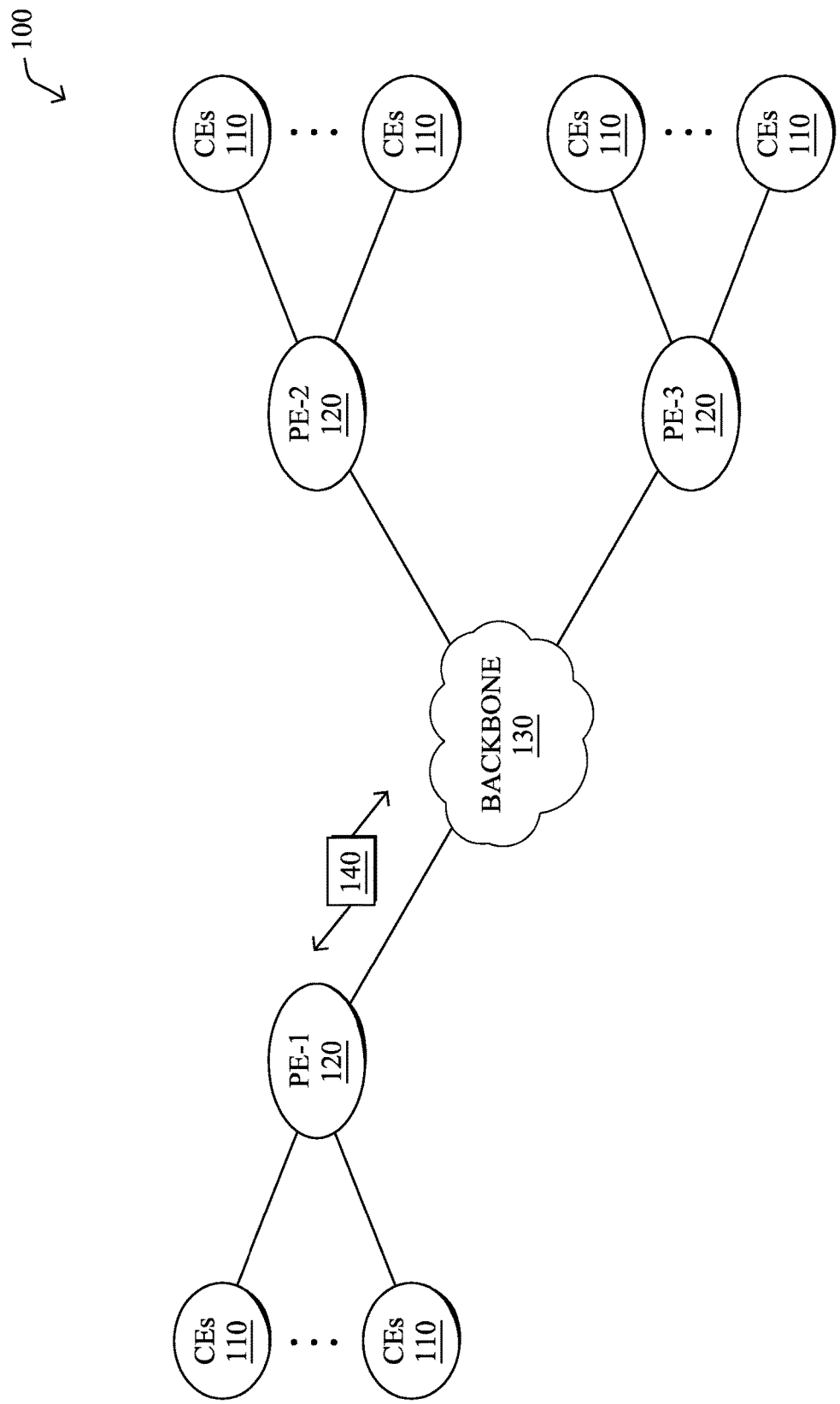
FIGS. 1A-1B illustrate an example communication network.

According to one or more embodiments of the disclosure, a device of a data mesh generates a first metadata layer for the data mesh that comprises metadata regarding a dataset having a plurality of data sources. The device identifies user role-specific metadata associated with a particular user role and based at least in part on the metadata regarding the dataset. The device generates a second metadata layer for the data mesh that comprises the user role-specific metadata associated with the particular user role. The device provides the user role-specific metadata for presentation to a user associated with the particular user role.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
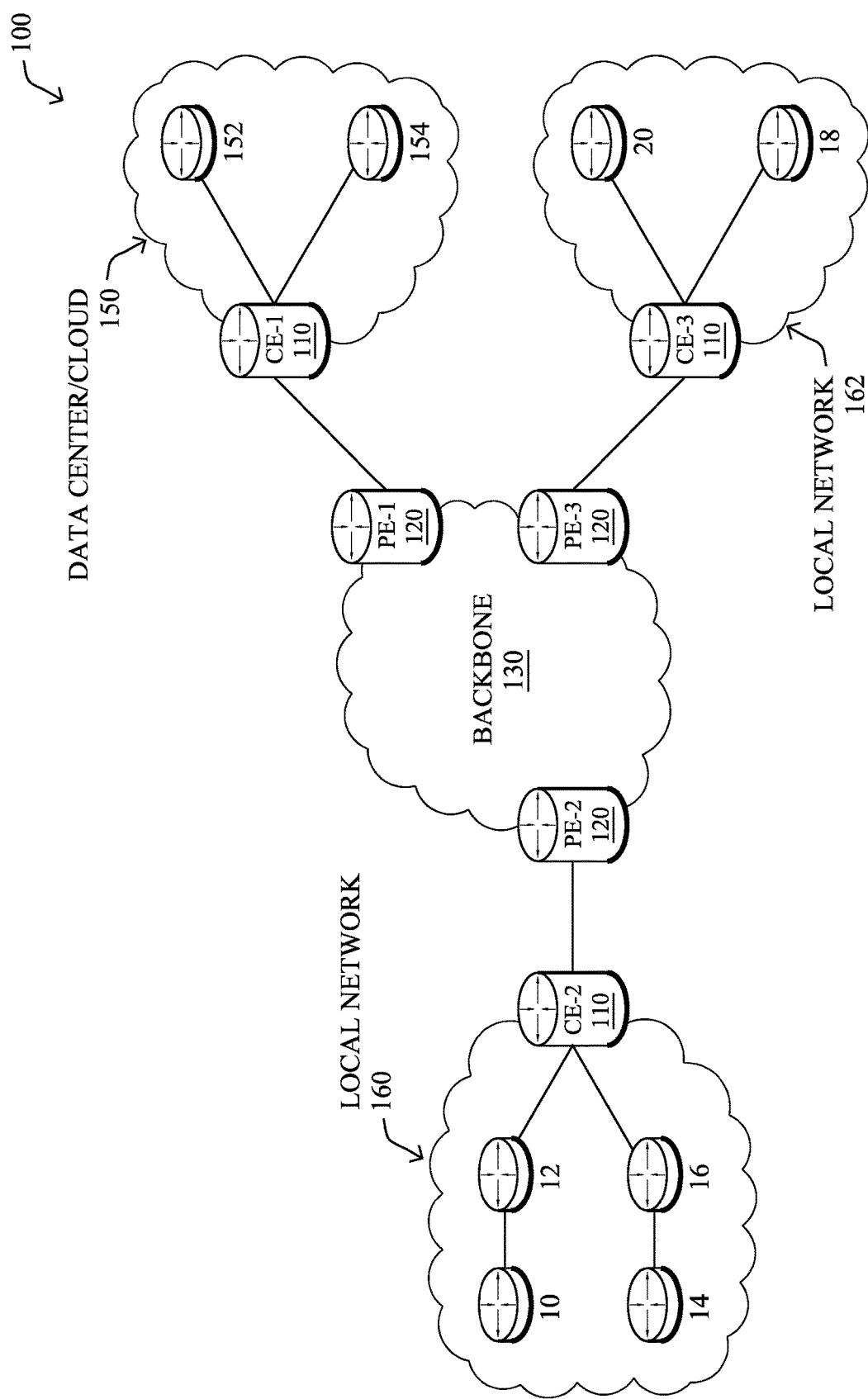

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
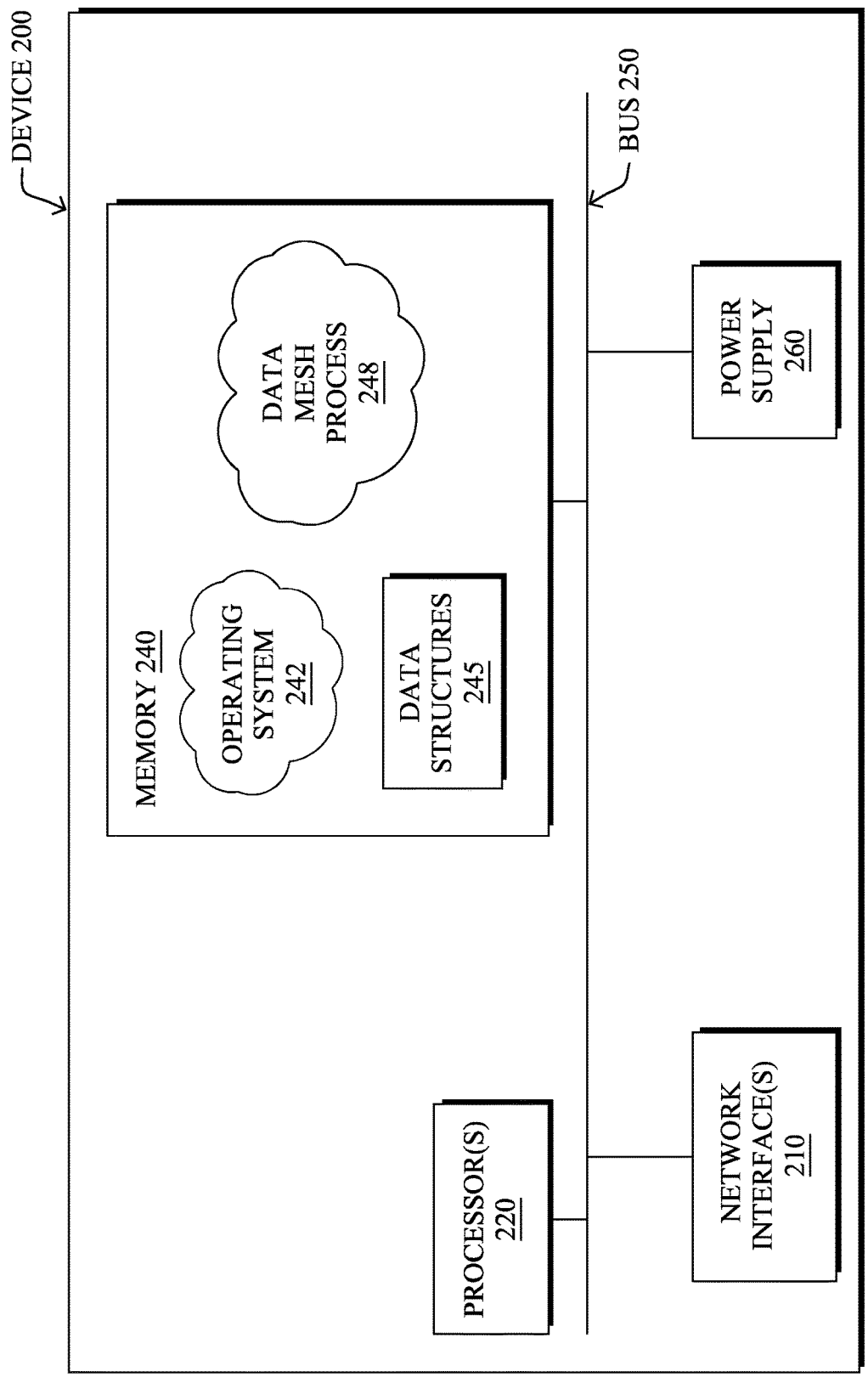
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a data mesh process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, data mesh process 248 may include computer executable instructions that, when executed by processor(s) 220, cause device 200 to perform the techniques described herein. To do so, in some embodiments, data mesh process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, data mesh process 248 may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that data mesh process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, semantic reasoning models, or the like.

As noted above, data meshes represent the third generation of data platforms and an evolution over prior generations. In the first generation, data was typically stored in proprietary, enterprise data warehouses, which required the enterprise to continually administer both the hardware and software needs of the system. More recently, data lakes have evolved as the second generation of data platforms. In a data lake, data from many sources can be stored in a centralized manner (e.g., in the cloud) and without imposing a proprietary schema on the data, greatly simplifying the initial data ingestion operation. While this approach helps to simplify the data ingestion task and scalability issues of the first generation, the centralization of data lakes also typically requires a dedicated team to oversee the data, often without any specific knowledge of the different stakeholders that rely on that data and their needs.

Thus, to address the shortcomings of data lakes, data mesh architectures have been proposed in recent years. Among other distinctions over data lakes is the decentralized approach taken in data meshes with respect to the underlying data. More specifically, data meshes introduce a decentralized approach whereby different types of data are owned and managed by domain-specific teams.

Figure 3A:
FIGS. 3A-3B illustrate examples of domains in a data mesh.
Figure 3B:
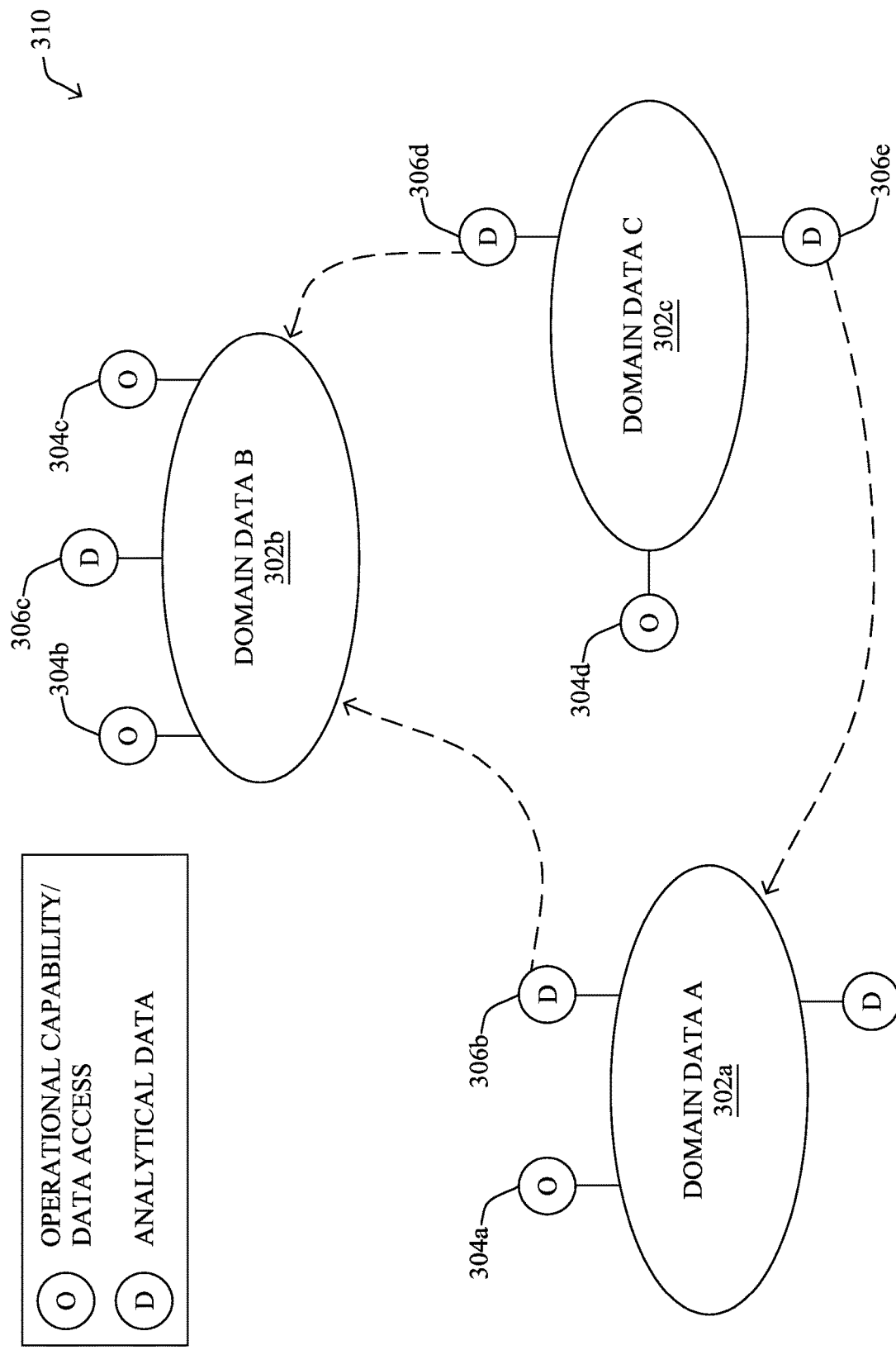

FIGS. 3A-3B illustrate examples of domains in a data mesh, according to various embodiments. FIG. 3A illustrates an example domain 300 in which a particular type of data may be grouped and treated as a 'product,' using the terminology common in data mesh literature. More specifically, domain data 302 may include source data sharing common traits that warrant being treated as a group for purposes of ownership and administration. As part of this ownership, the person or team responsible for domain data 302 is also responsible for both the operational capability/data access operations 304 and analytical data access operations 306. Typically, this entails exposing this data through any number of application programming interfaces (APIs) for the domain.

By way of example, assume that domain data 302 includes the data generated and used by a purchasing department of a company, such as purchase order information, delivery timing information, etc. In such a case, one operational capability/data access operation 304 may be the creation and entry of a new purchase order into the system and stored in domain data 302 (e.g., through the use of a dedicated API). Conversely, one analytical data access operation 306 for domain data 302 may provide a report of the purchase orders for the past week by the company.

FIG. 3B illustrates an example 310 of the interactions of different data domains within a data mesh, in various embodiments. As shown, assume now that there are three different data domains within the data mesh of a company that store domain data 302a, domain data 302b, and domain data 302c, respectively. For instance, say that domain data 302a is owned by the purchasing department of the company, domain data 302b is owned by the accounts payable department of the company, and domain data 302c is owned by the accounts receivable department of the company. In such a case, the purchasing department may be responsible for purchasing components and other goods used by the company, the accounts payable department may be responsible for paying for such orders, and the accounts receivable department may be responsible for receiving payments for goods or services offered by the company.

In example 310, the different data domains may have various operations associated with them, some of which expose certain information across the domains. For instance, domain data 302a may have an operational capability operation 304a that allows a person to enter a new purchase order, as well as an analytical data operation 306a that allows the person to review the purchase orders that they created. In addition, there may also be another analytical data operation 306b associated with domain data 302a that summarizes and reports the purchase orders for a given week from domain data 302a.

Since the weekly reporting offered by analytical data operation 306b is also of value to the accounts payable department, the API or other mechanism for analytical data operation 306b may be exposed to this domain, thereby sharing certain information across the domains and into domain data 302b. For instance, the report information may indicate the weekly purchase orders that will need to be paid by the accounts payable department, at some point.

Similarly, the domain of domain data 302b may have its own operational capability/data access operations 304b-304c, as well as an analytical data operation 306c. Likewise, the domain of domain data 302c may have an operational capability/data access operation 304d, as well as analytical data operations 306d-306e. As shown, analytical data operation 306d may be used to provide cross-domain information to the domain of domain data 302b (e.g., to report the funds received by the company that are available to pay purchase orders) and analytical data operation 306e may be used to provide cross-domain information to the domain of domain data 302a.

With the decentralization in data meshes, a new issue arises: different users may have very different interests and with respect to a certain dataset. For instance, a SecDevOps user may primarily be concerned with sensitive data being exposed to unauthorized entities, the physical location of a data source for compliance with a data privacy policy or data sovereignty policy. For instance, the General Data Protection Regulation (GDPR) in the European Union has very strict requirements in terms of how personal data may be collected, stored, and shared. In contrast, though, a machine learning operations (MLOps) user may not care at all about such information and instead be concerned with whether the dataset has been cleansed from having duplicate information, errors, and the like.

Consequently, it is challenging today in data mesh frameworks to support the different views of a dataset that are needed by the different types of users. In addition, the current approach entails copying the needed data across different domains, which increases resource utilization.

User Role-Driven Metadata Layers in a Data Mesh

The techniques herein introduce a multi-plane metadata approach for a data mesh that enables visibility on the data stored in the data mesh for different user roles. In doing so, this can help to simplify the exposure of the dataset, and data derived therefrom, to the different types of users and without requiring data to be copied.

Illustratively, the techniques described herein may be performed by hardware, software, and/or firmware, such as in accordance with data mesh process 248, which may include computer executable instructions executed by the processor 220 (or independent processor of interfaces 210) to perform functions relating to the techniques described herein.

Specifically, according to various embodiments, a device of a data mesh generates a first metadata layer for the data mesh that comprises metadata regarding a dataset having a plurality of data sources. The device identifies user role-specific metadata associated with a particular user role and based at least in part on the metadata regarding the dataset. The device generates a second metadata layer for the data mesh that comprises the user role-specific metadata associated with the particular user role. The device provides the user role-specific metadata for presentation to a user associated with the particular user role.

Figure 4A:
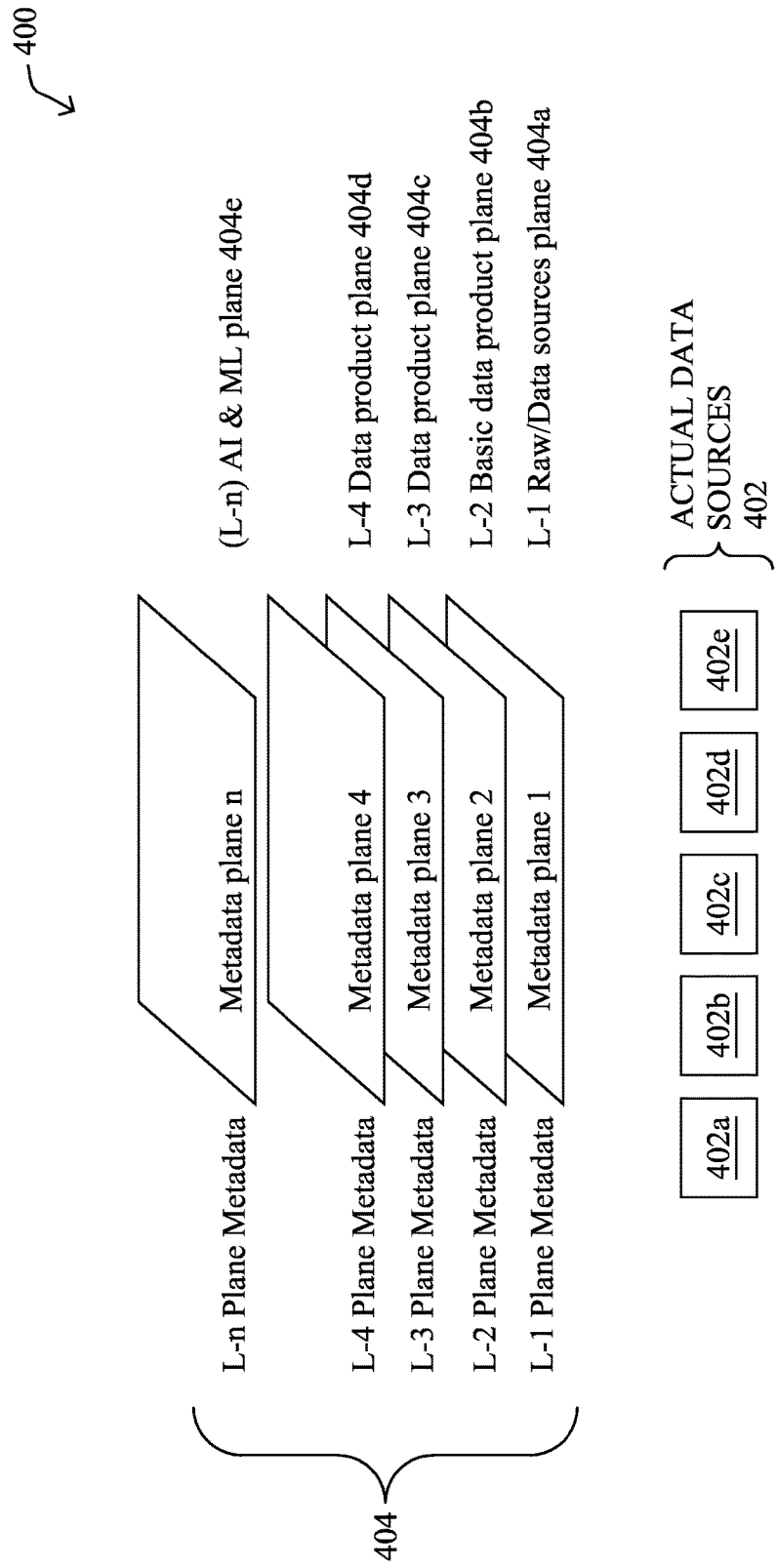
FIGS. 4A-4D illustrate an example of the generation of metadata layers in a data mesh.

Operationally, FIGS. 4A-4D illustrate an example of the generation of metadata layers in a data mesh, according to various embodiments. FIG. 4A illustrates an example 400 of the multi-layered metadata-based approach introduced herein. In general, the proposed approach entails building n-number of metadata layers 404 on top of a dataset in a data mesh from any number of actual data sources 402.

For instance, as shown, assume that there are five data sources 402: data sources 402a-402e, which may each store a portion of the underlying dataset. In some embodiments, each of data sources 402a-402e may be located at different places (e.g., geolocations, storage racks, etc.). Of course, there may be any number of data sources 402, in other implementations, and only five data sources 402 are shown in FIGS. 4A-4D for purposes of simplicity.

In various embodiments, metadata layers 404 may essentially form a hierarchy of metadata layers whereby its lowest layer 404a includes metadata for data sources 402a-402e, with higher level layers (e.g., layers 404b-404e shown) including more finished data products that may be tailored specifically to different user roles. In this context, the metadata in metadata layers 404 may take the form of referential data for the actual data sources 402, resulting in a decentralized, reference-based model for the data mesh. In various embodiments, this could take the form of a relational data model, graph data model, or the like, that interconnect connect the metadata between the various metadata layers 404, as well as to data sources 402.

Said differently, the techniques herein propose building a hierarchy (e.g., a semantic ontology) of metadata that may include any or all of the following:

Descriptive metadata used for the discovery of data products at different layers/planes of metadata layers 404.

Structured metadata regarding how the data products in the data mesh are organized.

Administrative metadata indicative of the routing, access control, and/or governance policies for the data products.

Etc.

In addition, metadata layers 404 also allow for the automation of create, read, update, and delete (CRUD) operations of metadata at different planes/layers of metadata layers 404.

Figure 4B:
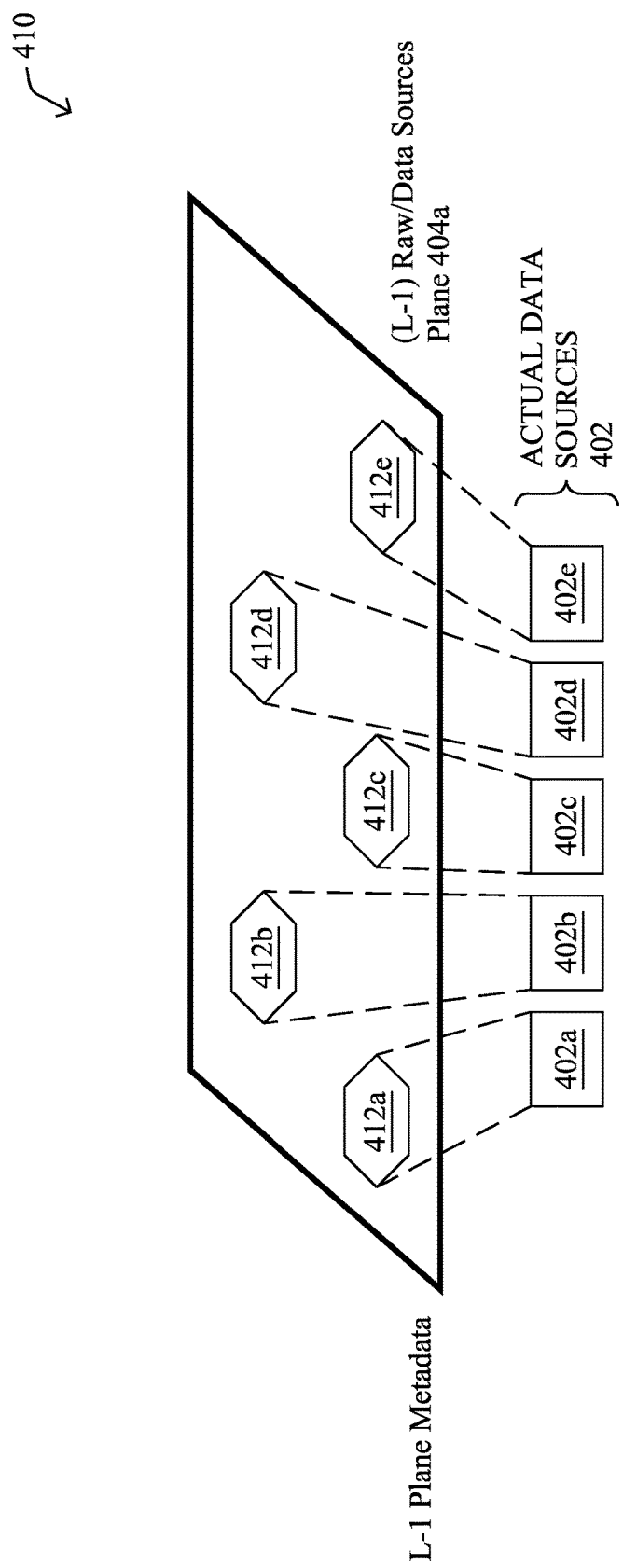

FIG. 4B illustrates an example 410 of how the lowest layer 404a of metadata layers 404 may be constructed within the data mesh (e.g., by a specially-configured device 200 of the data mesh), in various embodiments. Here, the proposed solution is to construct the layers of metadata layers 404 using a bottom-up approach, starting with data sources 402. In various embodiments, as shown, the lowest layer 404a of metadata layers 404 may be generated to include metadata 412a-412e for data sources 402a-402e, respectively. For instance, metadata 412a-412e may include metadata regarding the types of information stored by the respective data sources 402a-402e, their geolocations, or the like.

Figure 4C:
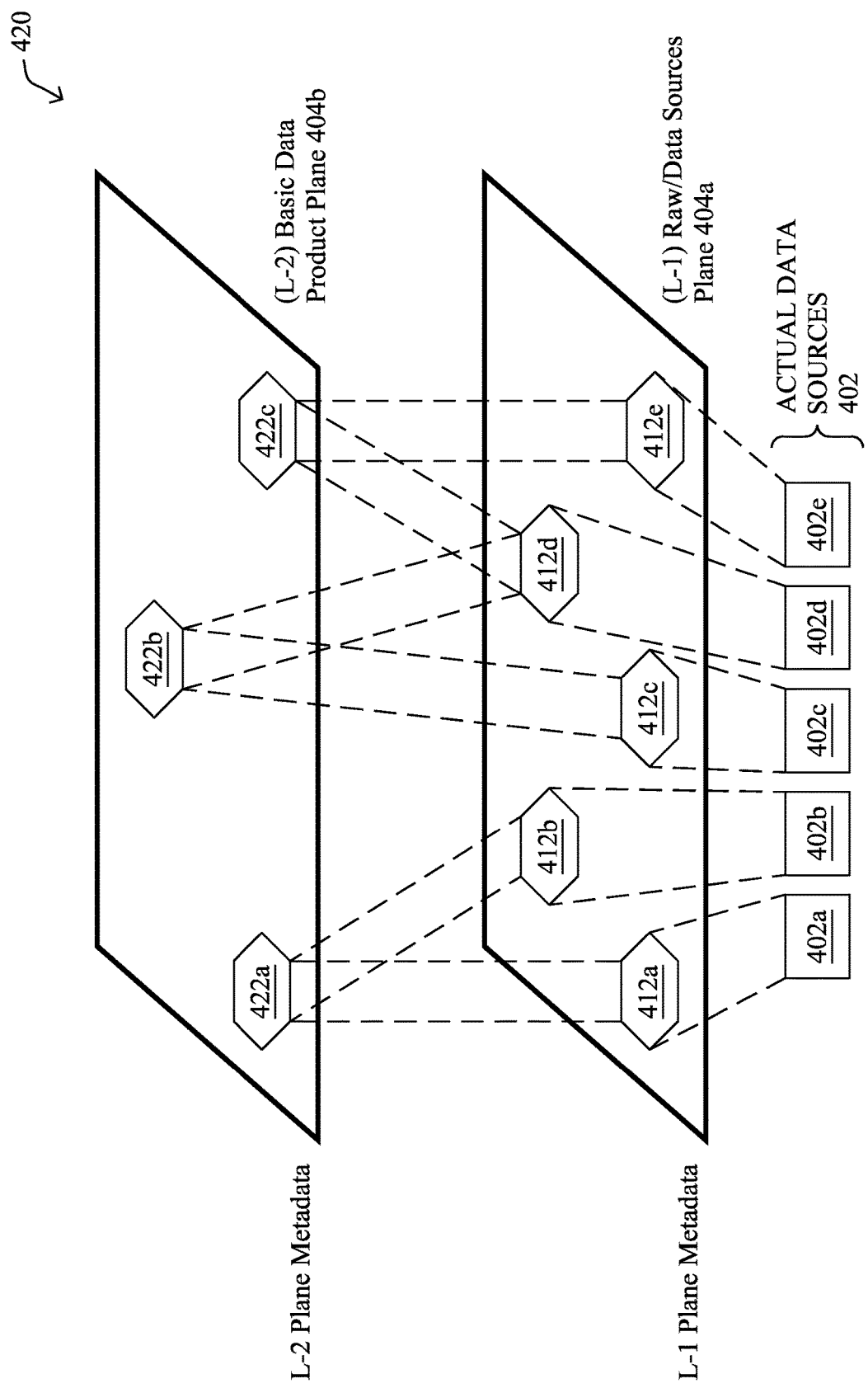

FIG. 4C illustrates an example 420 of the formation of a second layer 404b of metadata layers 404, according to various embodiments. Here, metadata 422a-422c in second layer 404b may be constructed on top of metadata 412a-412e in layer 404a. In other words, the metadata 422a-422c in layer 404b may represent an ontology of this data plane. In some embodiments, metadata 422a-422c may also be user role-specific, in whole, or in part. For instance, assume that layer 404b has been dedicated to support DevOps users and include metadata 422a-422c that is relevant to these users, such as integration-related types of metadata.

Figure 4D:
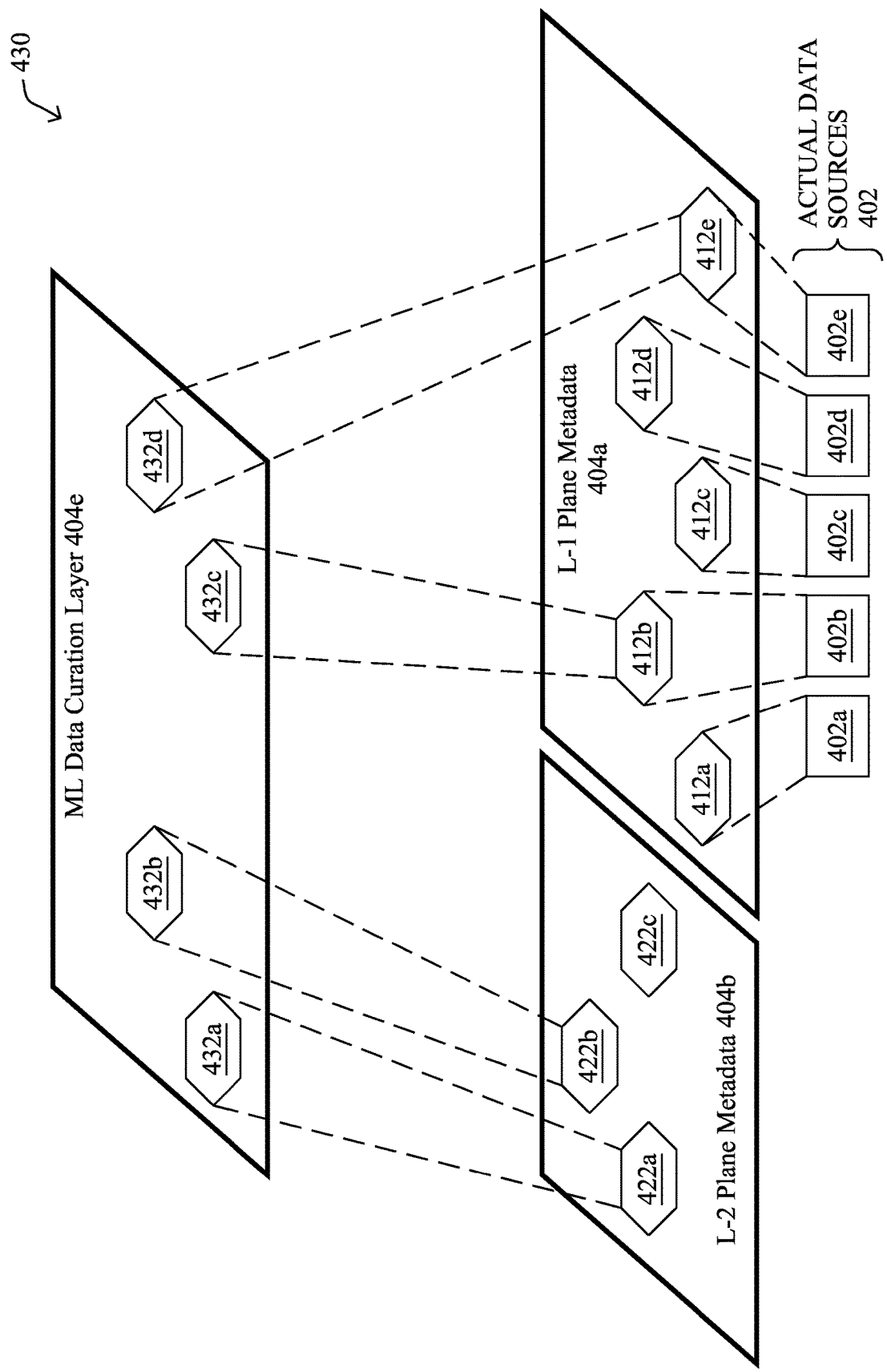

FIG. 4D illustrates an example 430 of the formation of a metadata plane that functions as the 'top' layer 404e of metadata layers 404, according to various embodiments. In various embodiments, layer 404e may include metadata 432a-432d that may be based on any or all of metadata 412a-412e in layer 404a, any or all of metadata 422a-422c in layer 404b, any or all of the metadata in any other layers in metadata layers 404 between layer 404e and layer 404b, or combinations thereof. In various embodiments, at least a portion of 432a-432d may also be user role-specific, such as for a different user role than that associated with layer 404b. For instance, as shown, metadata 432a-432d may include metadata related to machine learning (ML) data curation for presentation to an MLOps user (e.g., regarding the data preparation, data curations, etc.).

Figure 5:
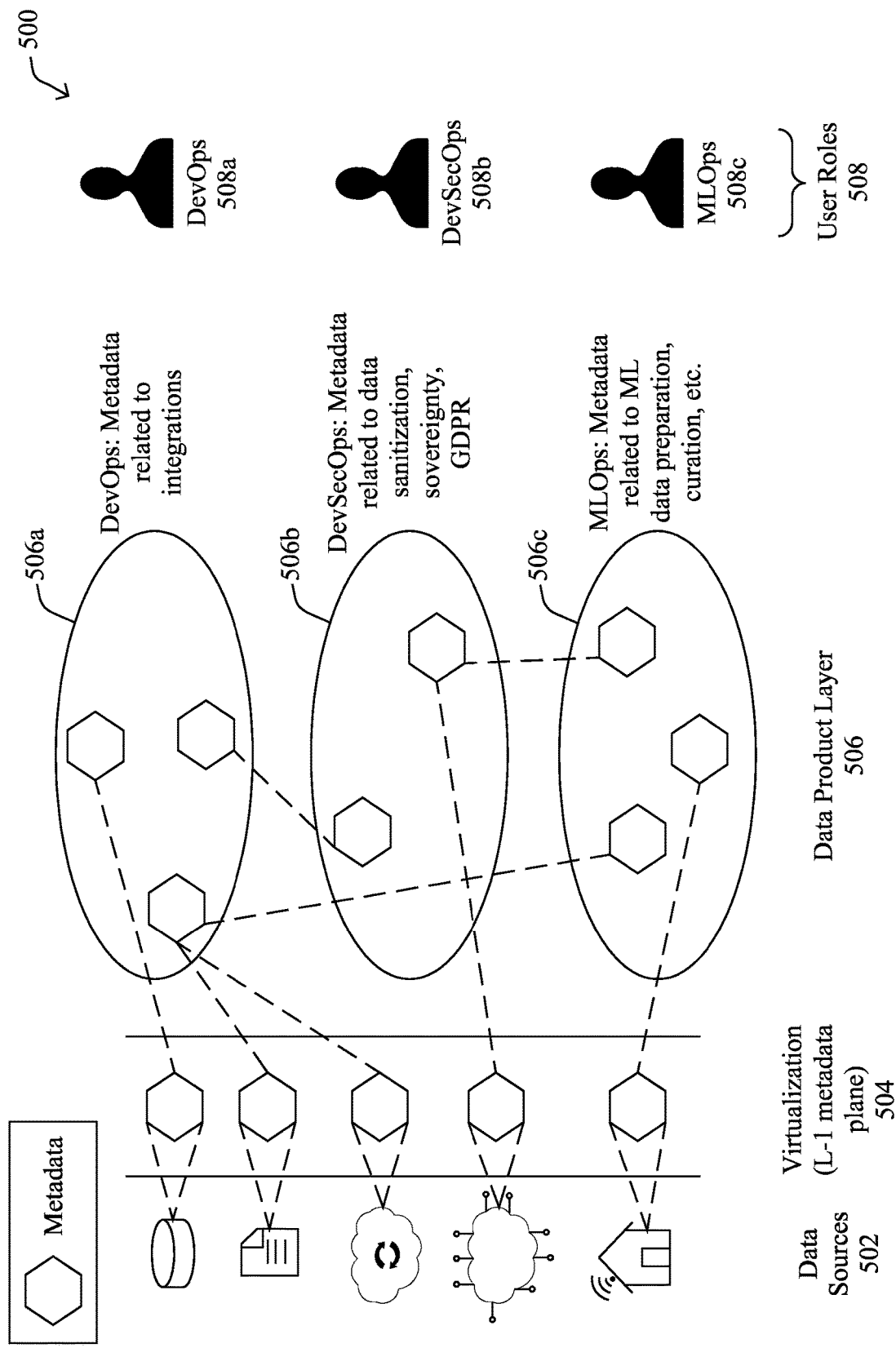
FIG. 5 illustrates an example of user role-specific metadata layers in a data mesh.

FIG. 5 illustrates an example 500 of user role-specific metadata layers in a data mesh, according to various embodiments. Continuing the previous examples in FIG. 4A-4D, assume that there are three user roles 508 that will use the data mesh to access information: a DevOps role 508a, a DevSecOps role 508b, and an MLOps role 508c. Further assume that these types of users will all make use of a dataset stored across any number of data sources 502.

In various embodiments, a device (or set of devices) may form a metadata layer 504 that includes a base set of metadata regarding the dataset stored across data sources 502 (e.g., their locations, types of data, etc.). In turn, this metadata can be used to also form corresponding metadata layers 506a-506c that include metadata specific to user roles 508a-508c, respectively. Similar to the examples in FIG. 4A-4D, metadata layers 506a-506c may also be hierarchical in nature. For instance, the MLOps layer 506c may exist at the top of the hierarchy, as it includes metadata based on metadata found in layer 504, as well as in layers 506a-506b. Below layer 506c, but above DevOps layer 506a, may also be DevSecOps layer 506b, which includes metadata based on both metadata found in layer 504, as well as in DevOps layer 506a.

It should be noted that while the proposed metadata layers are hierarchical in nature, some embodiments also provide for the metadata at a higher layer to be based on metadata found in any or all of the layers below it. For instance, while MLOps layer 506c may include metadata based on layer 506b directly below it, it may also include metadata based on layer 506a and/or layer 504.

Figure 6:
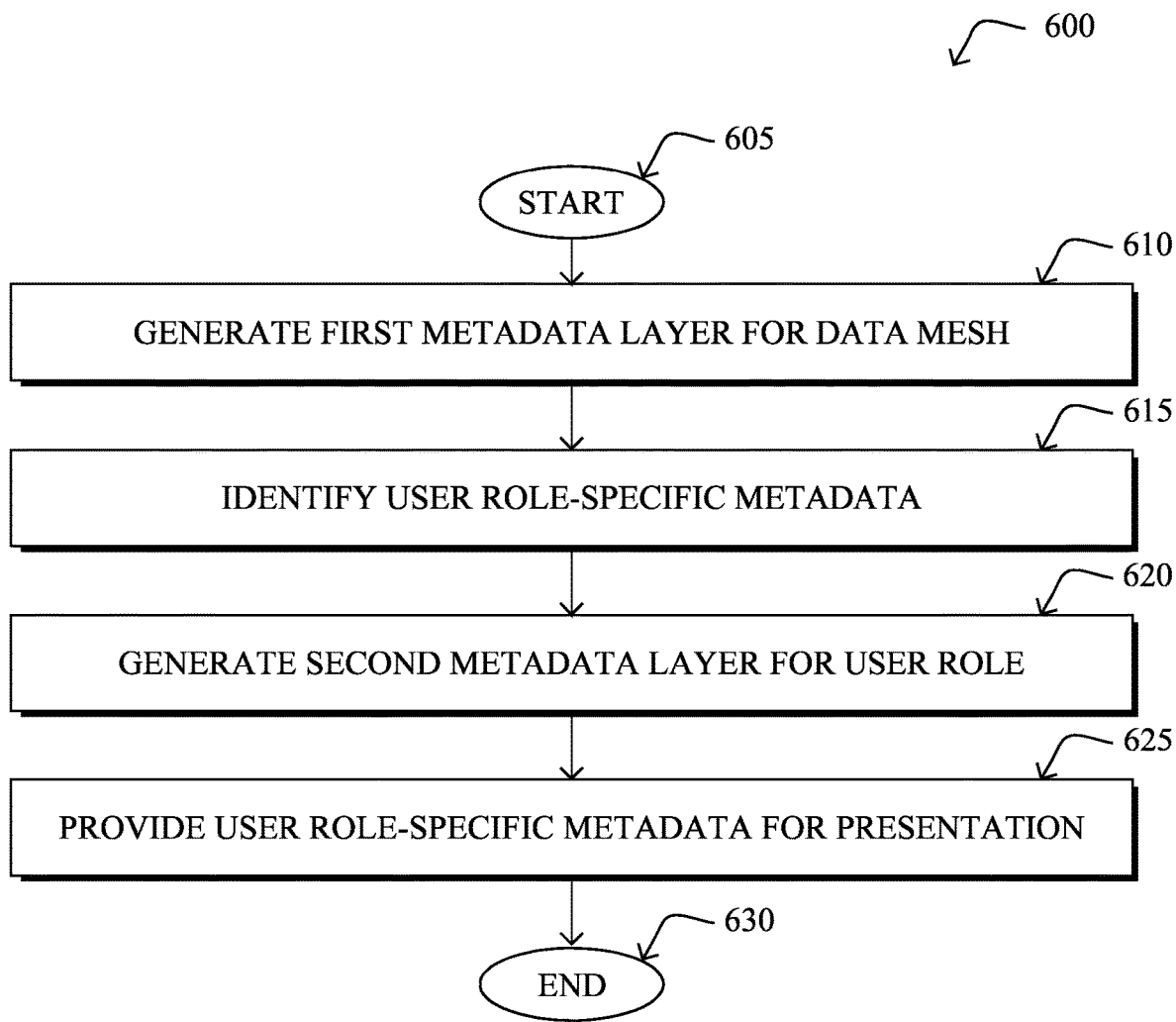
FIG. 6 illustrates an example simplified procedure for generating user role-driven metadata layers in a data mesh.

FIG. 6 illustrates an example simplified procedure 600 (e.g., a method) for generating user role-driven metadata layers in a data mesh, in accordance with one or more embodiments described herein. For example, a non-generic, specifically configured device (e.g., device 200), such as a controller or other device of a data mesh may perform procedure 600 by executing stored instructions (e.g., data mesh process 248). The procedure 600 may start at step 605, and continues to step 610, where, as described in greater detail above, the device may generate a first metadata layer for the data mesh that comprises metadata regarding a dataset having a plurality of data sources. In some embodiments, the metadata regarding the dataset indicates geolocations of the plurality of data sources. In various embodiments, the dataset is stored across the plurality of data sources.

At step 615, as detailed above, the device may identify user role-specific metadata associated with a particular user role and based at least in part on the metadata regarding the dataset. In one embodiment, the particular user role is a data security role and the user role-specific metadata is indicative of whether the dataset is stored in compliance with a data privacy or a data sovereignty policy. In another embodiment, the particular user role is a machine learning operations role and the user role-specific metadata is indicative of whether the dataset includes duplicate information.

At step 620, the device may generate a second metadata layer for the data mesh that comprises the user role-specific metadata associated with the particular user role, as described in greater detail above. In some embodiments, the device may do so by linking the user role-specific metadata to the metadata regarding the dataset in the first metadata layer. In a further embodiment, the user role-specific metadata is linked to the metadata regarding the dataset using a relational data model or a graph data model. In another embodiment, the user role-specific metadata comprises a pointer to at least a portion of the dataset.

At step 625, as detailed above, the device may provide the user role-specific metadata for presentation to a user associated with the particular user role. In some embodiments, the device may also generate a third metadata layer for the data mesh that comprises user role-specific metadata for a second user role and based at least in part on the metadata regarding the dataset. In one embodiment, the user role-specific metadata for the second user role is also based at least in part on the user role-specific metadata associated with the particular user role. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for generating user role-driven metadata layers in a data mesh, it is to be understood that various other adaptations and modifications may be made within the spirit and scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
generating, by a device of a data mesh, a first metadata layer for the data mesh that comprises metadata regarding a dataset having a plurality of data sources;
identifying, by the device, user role-specific metadata associated with a particular user role and based at least in part on the metadata regarding the dataset;
generating, by the device, a second metadata layer for the data mesh that comprises the user role-specific metadata associated with the particular user role; and
providing, by the device, the user role-specific metadata for presentation to a user associated with the particular user role.

2. The method as in claim 1, wherein the metadata regarding the dataset indicates geolocations of the plurality of data sources.

3. The method as in claim 1, wherein generating the second metadata layer for the data mesh comprises:
linking the user role-specific metadata to the metadata regarding the dataset in the first metadata layer.

4. The method as in claim 3, wherein the user role-specific metadata is linked to the metadata regarding the dataset using a relational data model or a graph data model.

5. The method as in claim 1, further comprising:
generating, by the device, a third metadata layer for the data mesh that comprises user role-specific metadata for a second user role and based at least in part on the metadata regarding the dataset.

6. The method as in claim 5, wherein the user role-specific metadata for the second user role is also based at least in part on the user role-specific metadata associated with the particular user role.

7. The method as in claim 1, wherein the particular user role is a data security role, and wherein the user role-specific metadata is indicative of whether the dataset is stored in compliance with a data privacy or a data sovereignty policy.

8. The method as in claim 1, wherein the particular user role is a machine learning operations role, and wherein the user role-specific metadata is indicative of whether the dataset includes duplicate information.

9. The method as in claim 1, wherein the user role-specific metadata comprises a pointer to at least a portion of the dataset.

10. The method as in claim 1, wherein the dataset is stored across the plurality of data sources.

11. An apparatus, comprising:
one or more network interfaces;
a processor coupled to the one or more network interfaces and configured to execute one or more processes; and
a memory configured to store a process that is executable by the processor, the process when executed configured to:
generate a first metadata layer for a data mesh that comprises metadata regarding a dataset having a plurality of data sources;
identify user role-specific metadata associated with a particular user role and based at least in part on the metadata regarding the dataset;
generate a second metadata layer for the data mesh that comprises the user role-specific metadata associated with the particular user role; and
provide the user role-specific metadata for presentation to a user associated with the particular user role.

12. The apparatus as in claim 11, wherein the metadata regarding the dataset indicates geolocations of the plurality of data sources.

13. The apparatus as in claim 11, wherein the apparatus generates the second metadata layer for the data mesh by:
linking the user role-specific metadata to the metadata regarding the dataset in the first metadata layer.

14. The apparatus as in claim 13, wherein the user role-specific metadata is linked to the metadata regarding the dataset using a relational data model or a graph data model.

15. The apparatus as in claim 11, wherein the process when executed is further configured to:
generate a third metadata layer for the data mesh that comprises user role-specific metadata for a second user role and based at least in part on the metadata regarding the dataset.

16. The apparatus as in claim 15, wherein the user role-specific metadata for the second user role is also based at least in part on the user role-specific metadata associated with the particular user role.

17. The apparatus as in claim 11, wherein the particular user role is a data security role, and wherein the user role-specific metadata is indicative of whether the dataset is stored in compliance with a data privacy or a data sovereignty policy.

18. The apparatus as in claim 11, wherein the particular user role is a machine learning operations role, and wherein the user role-specific metadata is indicative of whether the dataset includes duplicate information.

19. The apparatus as in claim 11, wherein the user role-specific metadata comprises a pointer to at least a portion of the dataset.

20. A tangible, non-transitory, computer-readable medium storing program instructions that cause a device of a data mesh to execute a process comprising:
generating, by the device, a first metadata layer for the data mesh that comprises metadata regarding a dataset having a plurality of data sources;
identifying, by the device, user role-specific metadata associated with a particular user role and based at least in part on the metadata regarding the dataset;
generating, by the device, a second metadata layer for the data mesh that comprises the user role-specific metadata associated with the particular user role; and
providing, by the device, the user role-specific metadata for presentation to a user associated with the particular user role.

* * * * *